(12) United States Patent
Hiraki

(10) Patent No.: US 8,786,878 B2
(45) Date of Patent: Jul. 22, 2014

(54) PRINT PROCESSING DEVICE, IMAGE PROCESSING DEVICE AND METHOD FOR SETTING PRINT MODE

(75) Inventor: Takuya Hiraki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 826 days.

(21) Appl. No.: 13/029,614

(22) Filed: Feb. 17, 2011

(65) Prior Publication Data

US 2011/0216356 A1 Sep. 8, 2011

(30) Foreign Application Priority Data

Mar. 2, 2010 (JP) ................................ 2010-045944

(51) Int. Cl.
*G06F 3/12* (2006.01)

(52) U.S. Cl.
USPC ....................................................... 358/1.15

(58) Field of Classification Search
None
See application file for complete search history.

(56) References Cited

U.S. PATENT DOCUMENTS

| 2002/0026453 A1* | 2/2002 | Mori et al. .................. 707/104.1 |
| 2006/0061805 A1* | 3/2006 | Kawamura .................... 358/1.15 |
| 2010/0165386 A1* | 7/2010 | Kusunoki ...................... 358/1.15 |
| 2011/0242567 A1* | 10/2011 | Miyata .......................... 358/1.13 |

FOREIGN PATENT DOCUMENTS

JP  A-2000-305925  11/2000

* cited by examiner

*Primary Examiner* — Marivelisse Santiago Cordero
*Assistant Examiner* — Mesfin Getaneh
(74) *Attorney, Agent, or Firm* — Muncy, Geissler, Olds & Lowe, P.C.

(57) ABSTRACT

A print processing device includes: a display device that displays a print preview of a print document; a plurality of application programs; an application specifying part that specifies the application program which is used to compose the print document; a print mode setting part that stores print mode setting information; an application determining part that determines whether or not the application program specified by the application specifying part is a program that is likely not to provide to the print mode setting part a print orientation information in correspondence with the print document as actually printed; a print preview display method deciding part that determines a display method of the print preview based on a determination result by the application determining part; and a print preview displaying part that displays the print preview according to the display method decided by the print preview display method deciding part.

14 Claims, 11 Drawing Sheets

| Functions | Values |
|---|---|
| Sheet Size | A4 210×297mm |
| | A5 148×210mm |
| | A6 105×148mm |
| | B5 182×257mm |
| | Letter 8.5 × 11 inch |
| | Others |
| Print Orientation | Longitude |
| | Lateral |
| N-up | Normal Printing |
| | 2-up |
| | 4-up |
| | 6-up |
| | 8-up |
| | 9-up |
| | 16-up |
| Binding Margin | No |
| | Left |
| | Upper |
| | Right |
| | Lower |
| Double-Sided Printing | No |
| | Long Side Binding |
| | Short Side Binding |

Fig. 6

PRINT PROCESSING DEVICE, IMAGE PROCESSING DEVICE AND METHOD FOR SETTING PRINT MODE

CROSS REFERENCE

The present application is related to, claims priority from and incorporates by reference Japanese patent application number 2010-045944, filed on Mar. 2, 2010.

TECHNICAL FIELD

The present invention relates to a print processing device, an image processing device, and a method for setting a print mode that include a print mode setting change program. The print mode setting change program is invoked by an application program, displays a setting screen for changing a print mode, and displays a print preview on the setting screen.

BACKGROUND

In a conventional print processing device, when a print request is executed by an application program, a print mode setting is performed by a printer driver prior to printing. In this case, the print mode setting is displayed on a graphical user interface (GUI) by the printer driver. The print mode setting can be changed when a user inputs a change for the print mode setting. A print preview is displayed on the GUI so that the user can confirm a post-printing state.

In Japanese patent application laid-open number 2000-305925, the following technology is disclosed. When print processing is performed after a unique function for a printer driver is assigned, a print result can be expressly confirmed. Specifically, when the print result is confirmed through a preview display before the print processing is actually performed, the print processing is executed through the application program in a state in which a spooler is set to be temporarily stopped. Then, a preview display program is initiated. Since the spooler is temporarily stopped, the actual printout is not performed.

However, an improper print review is occasionally displayed, and there had been a problem of inferior operability. In other words, even when the unique function for the printer driver is assigned, the preview display for the print result is automatically performed without being arranged. Therefore, when the improper orientation information of the assigned print is transmitted to the printer driver through the application program, the print preview is not properly displayed. Therefore, there is a high possibility to perform an improper print preview.

One of the objects in the present invention is to improve reliability and operability of a print preview operation. Specifically, considering a case where the improper orientation information of an assigned print is transmitted to the printer driver through the application program, a user is encouraged to confirm the print orientation so that the reliability and operability of the print preview display is improved.

SUMMARY

In order to resolve the problem mentioned above, a print processing device according to the present invention includes: a display device that is connected to the print processing device and that displays a print preview of a print document including a letter or an image; a plurality of application programs; an application specifying part that specifies the application program which is used to compose the print document; a print mode setting part that stores print mode setting information; an application determining part that determines whether or not the application program, which is specified by the application specifying part, is a program that is likely not to provide to the print mode setting part a print orientation information in correspondence with the print document as actually printed; a print preview display method deciding part that determines a display method of the print preview based on a determination result by the application determining part; and a print preview displaying part that displays the print preview according to the display method that is decided by the print preview display method deciding part.

A print processing device according to the present invention includes: a display device that is connected to the print processing device and that displays a print preview of a print document including a letter or an image; a memory part that includes programs; and a control part that executes the programs stored in the memory part. Wherein, the memory part includes: a plurality of application programs that compose print documents, an application specifying program that specifies the application program that composed the print document; an application determining program that determines whether or not the application program specified by the application specifying program is an application program that is likely not to provide to a print mode setting part print orientation information in correspondence with the print document as actually printed; a print preview display method deciding program that determines a display method of the print preview based on a determination result by the application determining program; and a print preview displaying program that displays the print preview in the display method that is determined by the print preview display method deciding program.

A method for setting a print mode according to the present invention, which is executed by a print processing device that is connected a display device displaying a print preview of a print document including a letter or an image, and that includes a plurality of application programs includes: specifying an application program that composes a print document; determining whether or not the specified application program is an application program that is likely not to provide print orientation information in correspondence with the print document as actually printed; deciding a display method based on the determination result; and displaying the print preview of the print document at the display device based on the determined display method.

One of the advantages of the present invention is to improve the reliability and operability of the print preview display.

BRIEF DESCRIPTION OF THE DRAWINGS

FIG. 6 is an explanatory schematic view of each setting value.

DETAILED DESCRIPTION

Figure 1:
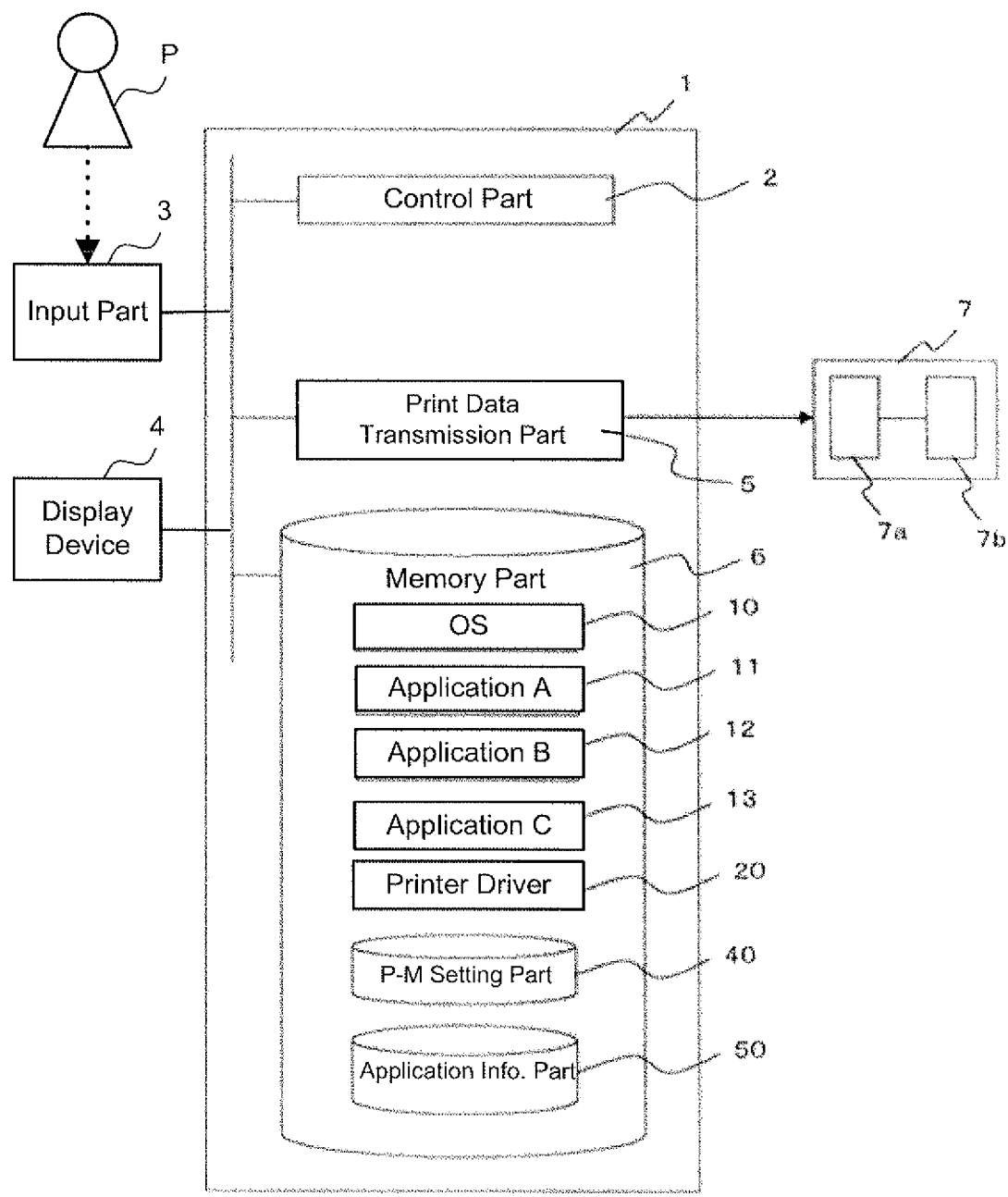
FIG. 1 a configuration diagram of a print processing device of a first embodiment according to the present invention.

Embodiments according to the present invention are explained below with reference to the drawings. The same reference numeral is assigned to a common element in each of the drawings. FIG. 1 is a configuration diagram of a print processing device of a first embodiment according to the present invention. A personal computer as an example of a print processing device is explained in the following embodiments.

First Embodiment

In FIG. 1, a printing environment of the first embodiment is configured with a personal computer (hereinafter: "computer") 1 and a printer 7. The computer 1 includes a control part 2, a print data transmission part 5, and a memory part 6. The computer 1 is also connected to an input part 3 and a display device 4. The control part 2 is configured with, for example, a central processing unit (CPU) and controls the input part 3, the display device 4, and the print data transmission part 5 based on a wide variety of programs and data stored in the memory part 6.

The input part 3 is configured with, for example, a keyboard and a mouse, and accepts entry from a user P. The display device 4 is configured with, for example, a liquid crystal display (LCD) and displays letters and images on a screen with control by the control part 2. The print data transmission part 5 is controlled by the control part 2 and transmits print data, which is read from the memory part 6, to the printer 7.

The printer 7 includes a printer control part 7a that controls the printer 7 and a print mechanism 7b that prints print data on a print sheet (not shown). The printer control part 7a is configured with an interface that receives print data transmitted by the computer 1, a random access memory (RAM) that temporarily stores the received print data, a read only memory (ROM) that stores font data and firmware that controls the printer 7 or the like, a CPU that controls the printer 7 in accordance with the firmware, and a print control part that controls the print mechanism 7b.

The memory part 6 is configured with, for example, a memory such as a RAM and a hard disc (HD). The memory part 6 stores an operating system (OS) 10, an application program A (hereinafter: "application A") 11, an application program B (hereinafter: "application B") 12, an application program C (hereinafter: "application C") 13, a printer driver 20, a print mode setting part 40 (P-M setting part), and an application information part 50.

The OS 10 is software to manage the entire computer 1 so as to provide basic functions that are commonly used by the applications A 11, B 12, and C 13, such as input and output functions, for example, data entry through the input part 3 and screen output to the display device 4, and management of the memory part 6 that are controlled by the control part 2. In the first embodiment, Windows® from Microsoft Corporation is used as the OS 10.

The application A 11 is, for example, a program that is for Power Point® from Microsoft Corporation. The application B 12 is, for example, a program that is for Excel® from Microsoft Corporation. The application C 13 is, for example, a program that is for Word® from Microsoft Corporation. These programs function to specify by which application a document to print was composed in a preview display process. In this application, these programs refer to applications or application programs. These applications A 11, B 12, and C 13 are controlled by the OS 10. These applications A 11, B 12, and C 13 include the following function. The user P inputs input data through the input part 3. And, the user P operates the input data through the input part 3. Then, when the user P pushes down a "print" button that is displayed on the display device 4, a print command is input. As a result, printing of the data is instructed to the printer driver 20.

The printer driver 20 is a program to convert document data that is formed by the applications A 11, B 12, or C 13 into data in another format that is interpretable by the printer 7. The printer driver 20 is also a program to provide a GUI to the user P for setting functions of the printer driver 20 or the printer 7 before printing.

The print mode setting part 40 stores print mode setting information that is designated for setting the print mode, for example, a sheet size, a print orientation, N-up (the number of pages printed in one sheet), a binding margin, and double-sided printing.

The application information part 50 stores a list of application names that are likely not to provide a proper print orientation to the print mode setting part 40. Hereinafter, these applications are named improper orientation possible applications (IOP applications). In practice, Word® and Power Point® provided by Microsoft Corporation, for example, are categorized as IOP applications. On the other hand, there are applications that constantly provide proper print orientation information regardless of which sheet size, landscape or portrait, 2-up or 4-up etc. are chosen for the print operation. Hereinafter, such applications are named consistent proper orientation applications (CPO applications). Moreover, the proper print orientation is defined as an orientation in correspondence with the actually printed document.

Figure 2:
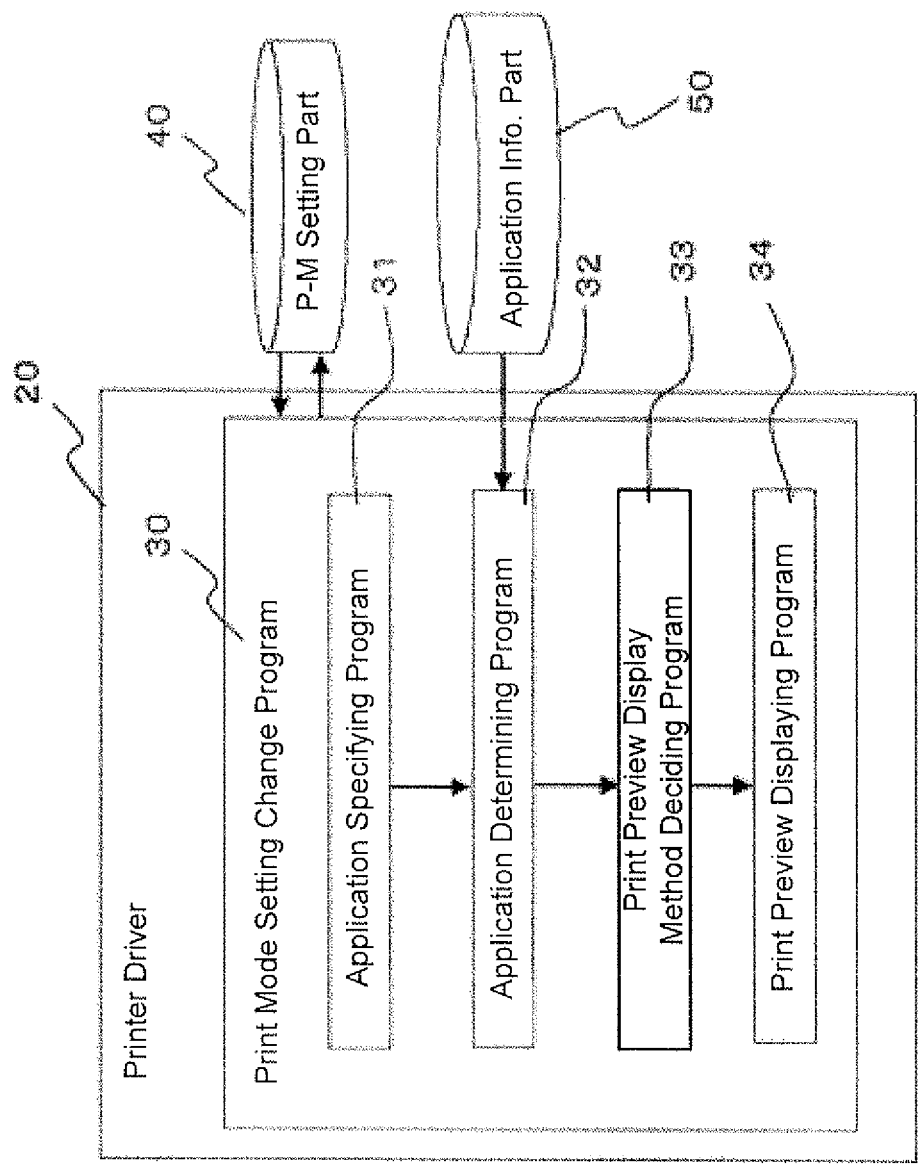
FIG. 2 is a block diagram of a configuration of a printer driver of the first embodiment.

FIG. 2 is a block diagram of a configuration of the printer driver of the first embodiment. In FIG. 2, the printer driver 20 includes a print mode setting change program 30. The print mode setting change program 30 is responsible for a function to provide a GUI as one of the functions of the printer driver 20. The print mode setting change program 30 includes an application specifying program 31, an application determining program 32, a print preview display method deciding program 33 (print preview display method deciding part), and a print preview displaying program 34.

The application specifying program 31 is executed by the control part 2. In this case, the control part 2 functions as an application specifying part to specify an application by which the print mode setting change program 30 of the printer driver is invoked. The application determining program 32 is executed by the control part 2. In this case, the control part 2 functions as a determination part to determine whether or not the application specified by the application specifying program 31 is the IOP application based on information from the application information part 50. The print preview display method deciding program 33 is executed by the control part 2. In this case, the control part 2 functions as a print preview display method deciding part to decide a display method for a print preview based on the determination result of the application determining program 32. When the print preview displaying program 34 is executed by the control part 2, the print preview displaying program 34 functions as a print preview displaying part to display the print preview in a display method that is decided by the print preview display method deciding program 33.

Figure 3:
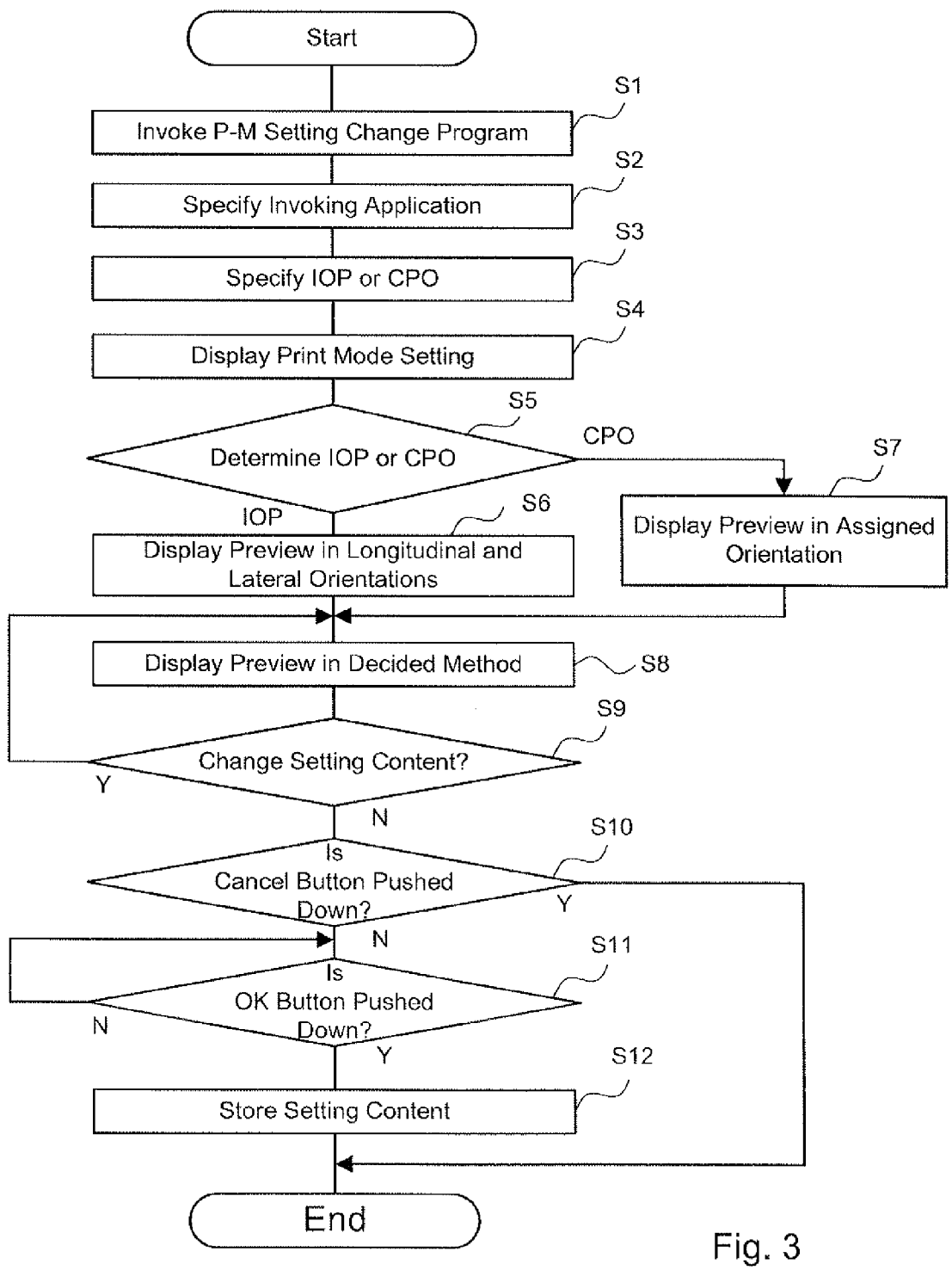
FIG. 3 is a flow diagram of the first embodiment.

Next, performance of the first embodiment is explained according to a flow diagram shown in FIG. 3. FIG. 3 is a flow diagram for a process of the first embodiment. At Step 1, any one of the applications A 11, B 12, and C 13 invokes the print mode setting change program 30. At this time, print mode setting information is provided to the print mode setting change program 30 from the print mode setting part 40 in correspondence with the invoking application.

At Step 2, the application specifying program 31 specifies a name of an application that invoked the print mode setting change program 30. After the application specifying program 31 specifies a process used to compose the document, which is a parent of a process in which the print mode setting change program 30 is running, property information of the document is obtained. Of the obtained property information, a value (or content) of an explanation attribute is designated as the name of the application invoking the print mode setting change program 30. The above value (content) of the explanation attribute may include a product version, an official product name, or an internal file name. For Word® from Microsoft Corporation, a file called Microsoft Office Word is available to obtain these values.

Next, the application determining program 32 determines whether or not the specified application assigns a proper value as print orientation information that is included in the print mode setting unit 40 (Step 3). Specifically, after a list of names of applications that are stored in the application information unit 50 is obtained, it is determined whether or not there is a name that matches with the name of the specified application at Step 2 in the list. When there is the matched name in the list, the application is specified as an IOP application. When there is not the matched name in the list, the application is specified as a CPO application. In other word, one of the IOP and CPO application is specified in Step 3. Correspondingly, a flag is stored in the memory part 6 to identify the specified application.

Figure 4:
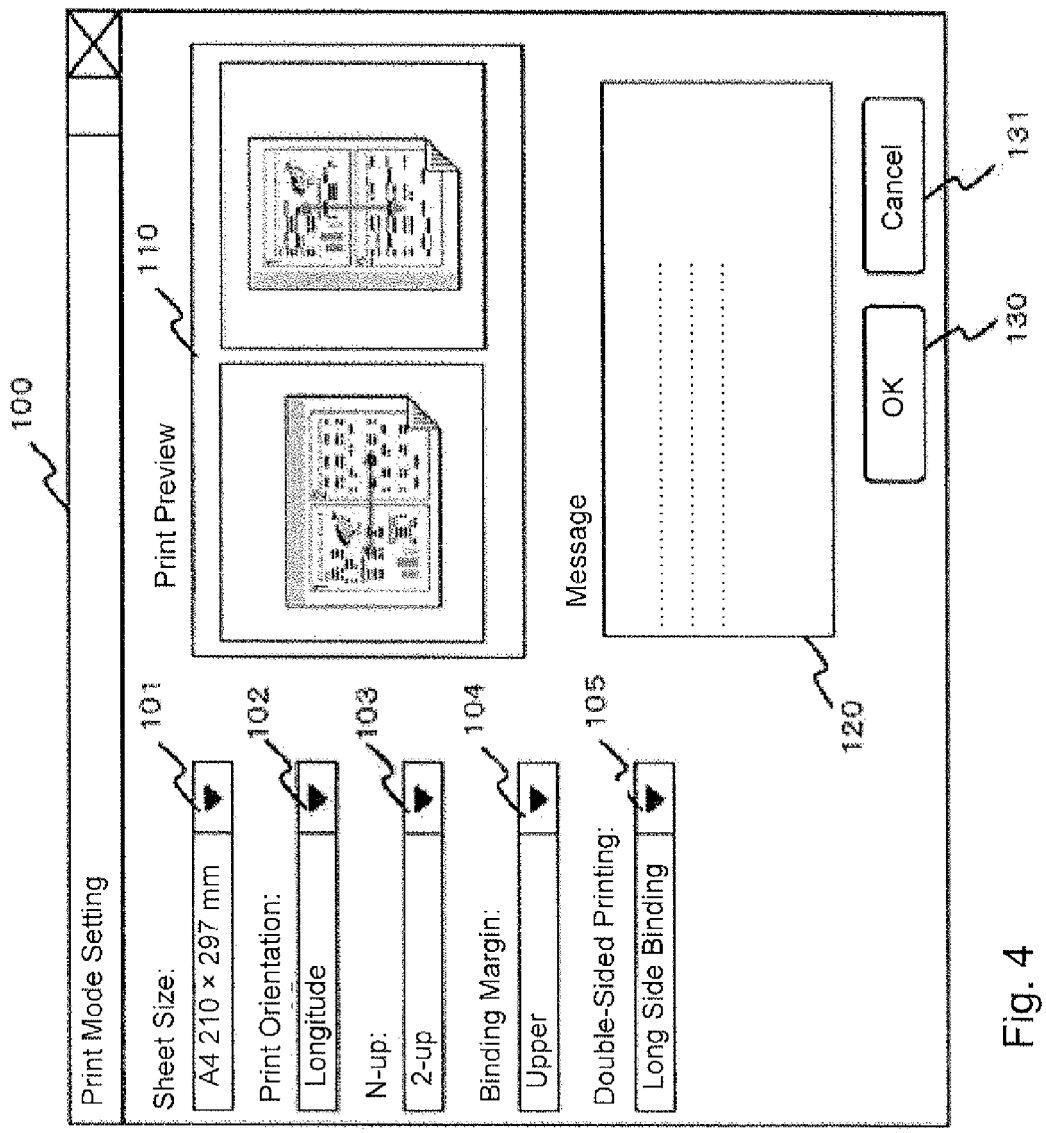
FIG. 4 is an explanatory schematic view of a print mode setting screen of the first embodiment.
Figure 5:
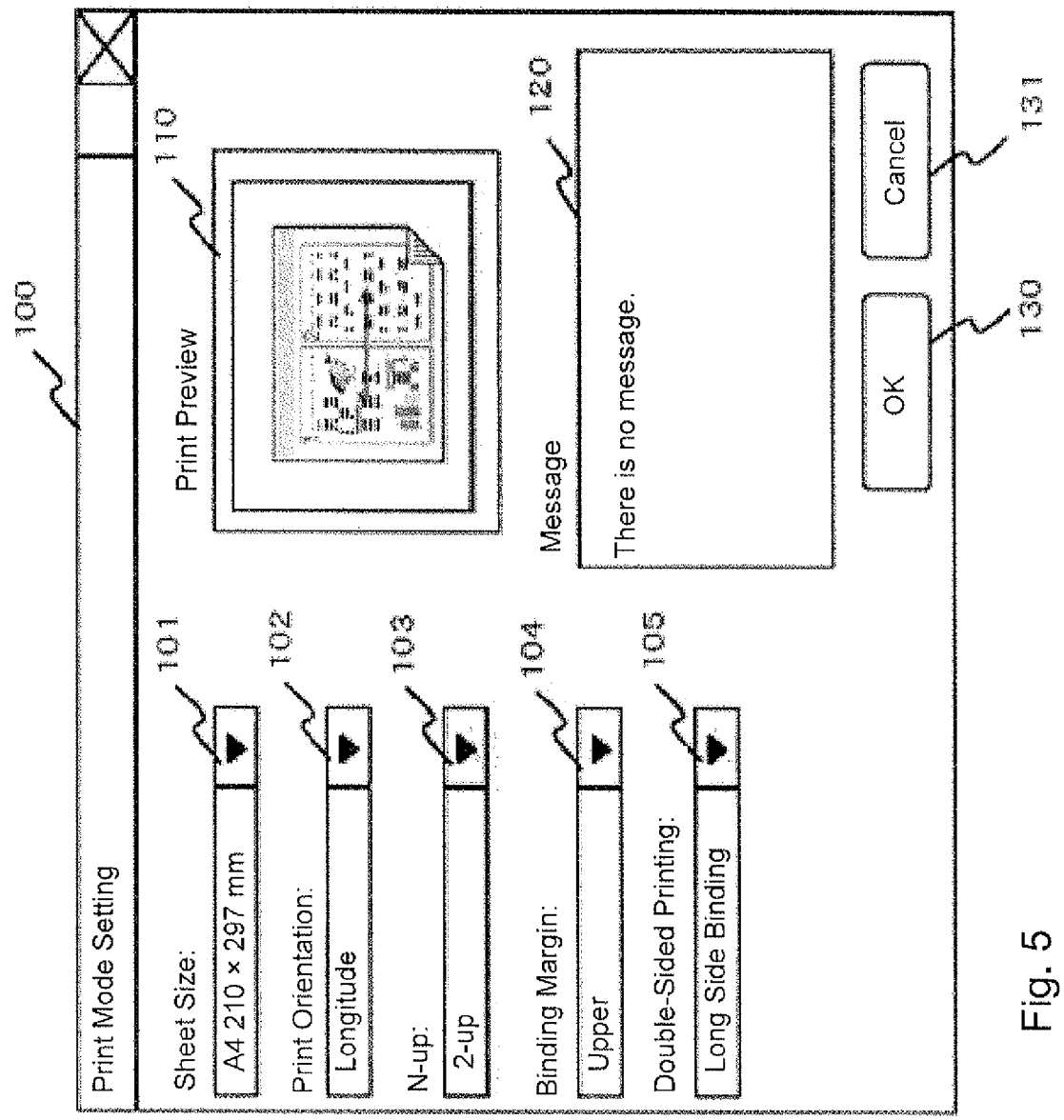
FIG. 5 is an explanatory schematic view of the print mode setting screen of the first embodiment.

At Step 4, the print mode setting change program 30 displays a setting screen (or print mode setting) at the display device 4 based on the print mode setting information read from the print mode setting part 40. The setting screen that is displayed at this step is shown in FIG. 4 and FIG. 5. FIGS. 4 and 5 are explanatory schematic views of a print mode setting screen of the first embodiment. In FIGS. 4 and 5, each of these settings are displayed in the print mode setting screen 100: a sheet size 101; a print orientation 102; N-up 103; a binding margin 104; double-sided printing 105; an "OK" button 130, and a "Cancel" button.

Selectable values for each of the above settings are enumerated in a list shown in FIG. 6. FIG. 6 is an explanatory schematic view of each setting value. The sheet size 101 assigns a sheet size to print. The print orientation 102 can select either using the sheet in a lateral orientation (landscape) or using the sheet in a longitudinal orientation (portrait). N-up 103 is a function to aggregate a plurality of pages into one sheet. The binding margin 104 is a function to insert a margin into any of four sides of the sheet. The double-sided printing 105 assigns whether page data is printed on only one side of the sheet or on both sides of the sheet. When the page data is printed on both sides of the sheet, the double-sided printing 105 assigns either printing the sheet in a state in which a rear side is rotated by 180 degrees so that when the short side of the sheet is bound, it is easy to read the printed sheet or in which the rear side is not rotated so that the long side of the sheet is bound, it is easy to read the printed sheet.

In the print mode setting screen 100 shown in FIGS. 4 and 5, the following settings are selected: the sheet size 101 is A4 (210 mm×297 mm); the print orientation 102 is longitude; the N-up 103 is 2-up; the binding margin 104 is upper; and the double-sided printing 105 is the long side binding.

At Step 5, the type of the specified application is determined. Specifically, the application determining program 32 determines the name of the application specified at Step 2 in the list of the application information part 50, either IOP or CPO application.

When the IOP application is determined at Step 5, the print orientation information provided by the application is not always dependable. The following display method of the print preview is adopted: both previews in a longitudinal print orientation (portrait) and a lateral print orientation (landscape) are displayed at Step 6. In this case, the print preview display is shown in the print mode setting screen 100 in FIG. 4.

In this application, a print orientation provided by the application is defined as a first print orientation. A print preview in the first print orientation is defined as a first print preview. Another print orientation that, not provided from the application, differs from the first print orientation is a second print orientation. The other print preview in the second print orientation is defined as a second print preview.

In a preferred embodiment, the first and second print orientations have a 90 degree difference. However, 45 degrees or 180 degrees are also applicable. It is not necessary to accurately set 45, 60, 90, or 180 degrees. When the orientations are set substantially at one of these degrees, it is practically acceptable as long as the user can identify the proper orientation to print the documents.

On the other hand, when the CPO application is determined at Step 5 (matched name is present), the (first) print orientation information provided by the application is dependable. The print preview display method deciding program decides a display method of the print preview in which the print preview is displayed in the first print orientation provided by the application at Step 7. In this case, only the print preview in the first original print orientation is displayed. The print preview display is shown in the print mode setting screen 100 in FIG. 5.

At Step 8, the print preview displaying program 34 displays the print preview in the print preview display method that is decided at Step 6 or Step 7. A print preview 110 shown in FIG. 4 or FIG. 5 is formed with the following conditions: a print orientation assigned by the print orientation 102 is obtained; a longitude to lateral ratio is obtained based on a sheet size assigned by the sheet size 101; then, a rectangle with the obtained ratio and the orientation is drawn; a folding back portion is drawn in accordance with the setting assigned by the double-sided printing 105; a rectangle is drawn at a position in which a margin assigned by the binding margin 104 is inserted; and a rectangle representing a page or pages is arranged by shrinking in accordance with a value assigned by the N-up 103.

When the page preview display method is decided at Step 7, the print preview 110 only shows the print preview in the original print orientation as shown in FIG. 5. In addition, the phrase "There is no message" is displayed in a message field 120.

When the page preview display method is decided at Step 6, the print preview 110 shows both print previews, in a longitudinal print orientation (portrait) and in a lateral print orientation (landscape), as shown in FIG. 4. In addition, the phrase "In application A, settings for a sheet size and a print orientation that are assigned by the application have a priority over the settings assigned here. Because the print orientation assigned here may be different from an actual one, please confirm an entire image with both longitudinal and lateral print orientations" is displayed in the message field 120. This message is an example in the case where the print mode setting change program 30 is invoked by, for example, the application A 11.

In an example of the print preview 110 shown in FIG. 4, the following settings are selected: the sheet size 101 is A4 (210 mm×297 mm); the print orientation 102 is longitude; the N-up 103 is 2-up; the binding margin 104 is upper; and the double-sided printing 105 is the long side binding. The print preview 110 is drawn in the following manner. Since the sheet size is A4 (210 mm×297 mm), the longitude to lateral ratio is 210:297. In order to decide an orientation for drawing a rectangle, it is necessary to pay attention to the setting value of the N-up 103. When the setting value is 2-up, 6-up, or 8-up, the values for the longitudinal and lateral orientations assigned based on the print orientation are reversed. Here, since the N-up 103 is 2-up, and the print orientation 102 is longitude (because the application by which the print mode setting change program 30 is invoked assigned the longitudinal print orientation), a rectangle with the longitude to lateral ratio of 210:297 is drawn in the left hand side, and a rectangle with the longitude to lateral ratio of 297:210 is drawn in the right hand side next to the rectangle with the longitude to lateral ratio of 210:297. In other words, the print preview that is assigned by the application is displayed at the center of the screen.

Next, because the double-sided printing 105 is the long side binding, a folding back portion is drawn. At this time, it is necessary to pay attention to a position of the binding margin 104. Because the binding margin 104 is upper, the folding back portion is drawn in the lower right position of both longitudinal and lateral print previews. Then, because the binding margin 104 is upper, and the print orientation 102 is longitude, a rectangle representing a position for a margin is drawn in an upper part of the longitudinal print preview, and a rectangle representing a position for a margin is drawn in a left part of the lateral print preview. Usually, a relative position of the binding margin 104 for the longitudinal orientation of the print orientation 102 with respect to the lateral orientation of the print orientation 102 is at a position rotated by 90 degrees in a clockwise direction. In the embodiment, because the N-up 103 is 2-up, a relationship between the longitudinal orientation and the lateral orientation is reversed so that the positions of both previews are rotated by 90 degrees in a counterclockwise direction. When the print orientation 102 is assigned as longitude, and the binding margin 104 is assigned as upper, the binding margin 104 is located at a left hand side that is a position rotated by 90 degrees in a counterclockwise direction (from the left side preview). Then, because the N-up 103 is 2-up, two rectangles are drawn next to each other. The rectangle is drawn with a size in a state in which the rectangle can fit within an originally drawn rectangle.

At Step 9, it is determined whether or not the setting content is changed. When the setting content is changed (Yes), the print mode setting change program 30 changes a value of a target function of the print mode setting screen 100. The print preview 110 is newly displayed with the changed setting content at Step 8. When the setting content is not changed (No), an OK button 130 or a Cancel button 131 is to be pushed down.

When the Cancel button 131 is pushed down at Step 10, the setting content that is set by the print mode setting screen 100 is discarded, and the print mode setting screen 100 is closed so that the print mode setting change program 30 is terminated. Next, the OK button 130 is pushed down at Step 11, the setting content that is set by the print mode setting screen 100 is stored in the print mode setting part 40 at Step 12, and the print mode setting screen 100 is closed so that the print mode setting change program 30 is terminated. Until the OK button 130 is pressed, the process is repeated.

As discussed above, according to the first embodiment, when there is a possibility that a proper print orientation is not transmitted to a printer driver through an application program, two types of print previews (in the longitudinal and lateral orientations) are displayed. Thereby, a user can visually determine a proper print orientation before the print operation initiates. For example, there is a case where properly assigned print orientation information is not transmitted to the printer driver through the application program. Particularly, with respect to a Microsoft Word® application program, when a print orientation of a print document is lateral (landscape), the print orientation that is assigned by the application program is longitude (portrait). Thus, when the print preview is displayed based on the assigned print orientation from the application program, it is different from an orientation of the print document. As discussed above, the present invention prevents displaying only an improper print preview with respect to the print document depending on the application program. Therefore, operability of a print preview display is improved.

Second Embodiment

Figure 7:
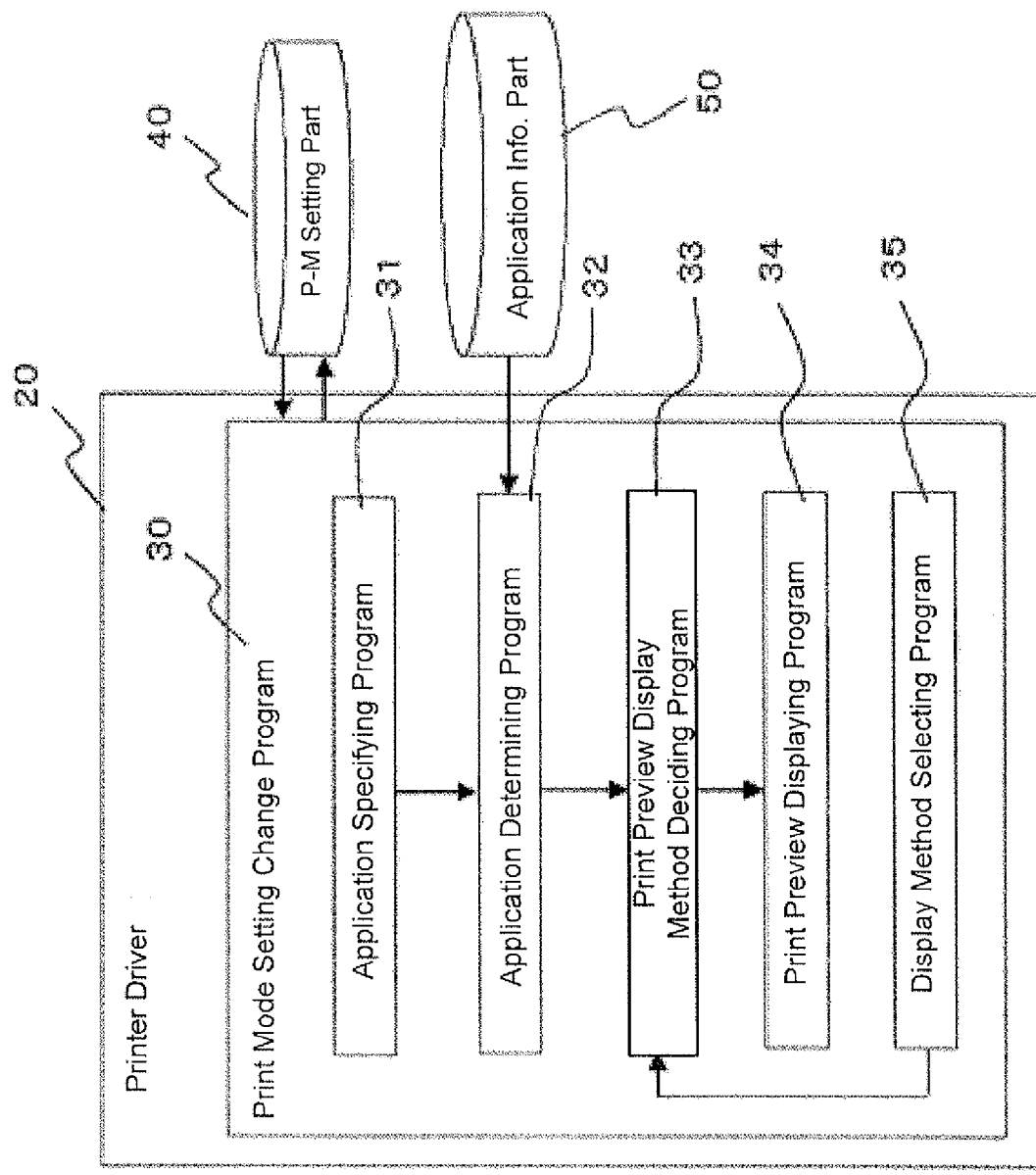
FIG. 7 is a block diagram of a configuration of a printer driver of a second embodiment according to the present invention.

Next, a second embodiment is explained. FIG. 7 is a block diagram of a configuration of a printer driver of the second embodiment according to the present invention. In FIG. 7, a display method selecting program 35, which is an additional program to the first embodiment, is added to the print mode setting change program 30 of the printer driver 20 of the second embodiment. The display method selecting program 35 is executed by the control part 2. In this case, the control part 2 functions as a display method selecting part to select a display method for a print preview that is displayed at a GUI of the display device 4 by the print mode setting change program 30. The rest of the configuration of the printer driver 20 of the second embodiment is the same as the first embodiment.

Figure 8:
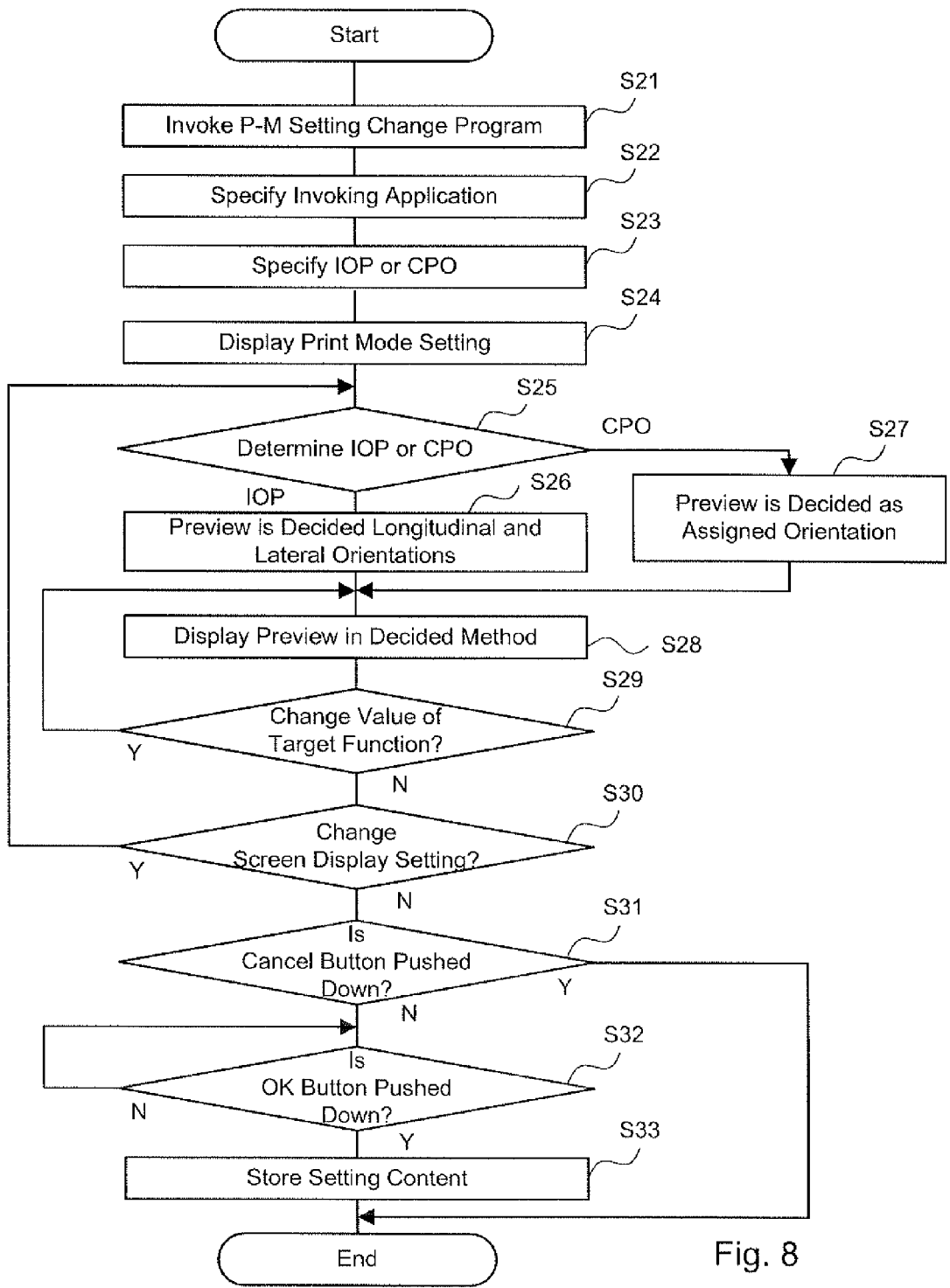
FIG. 8 is a flow diagram of the second embodiment.

Then, performance of the second embodiment is explained according to a flow diagram shown in FIG. 8. FIG. 8 is a flow diagram of operations of the second embodiment. The drawings that are used in the explanation of the first embodiment are employed in order to explain the second embodiment. First of all, any one of the applications A 11, B 12, and C 13 invokes the print mode setting change program 30 at Step 21. At this time, the invoking application gives the print mode setting part 40 to the print mode setting change program 30.

Next, the application specifying program 31 shown in FIG. 7 specifies a name of an application that invoked the print mode setting change program 30 at Step 22. After the application specifying program 31 specifies a file that executes a parent process of a process in which the print mode setting change program 30 is running, property information of the file is obtained. Of the obtained property information, a value of an explanation attribute is considered as the name of the application invoking the print mode setting change program 30.

Next, the application determining program 32 determines whether or not the specified application assigns a proper value as print orientation information that is included in the print mode setting unit 40 (Step 23). Specifically, after a list of names of applications that are stored in the application information unit 50 is obtained, it is determined whether or not there is a name that matches with the name of the specified application at Step 22 in the list. When there is the matched name in the list, the application is specified as an IOP application. When there is not the matched name in the list, the application is specified as a CPO application. In other word, one of the IOP and CPO application is specified in Step 23. Correspondingly, a flag is stored in the memory part 6 to identify the specified application.

Figure 9:
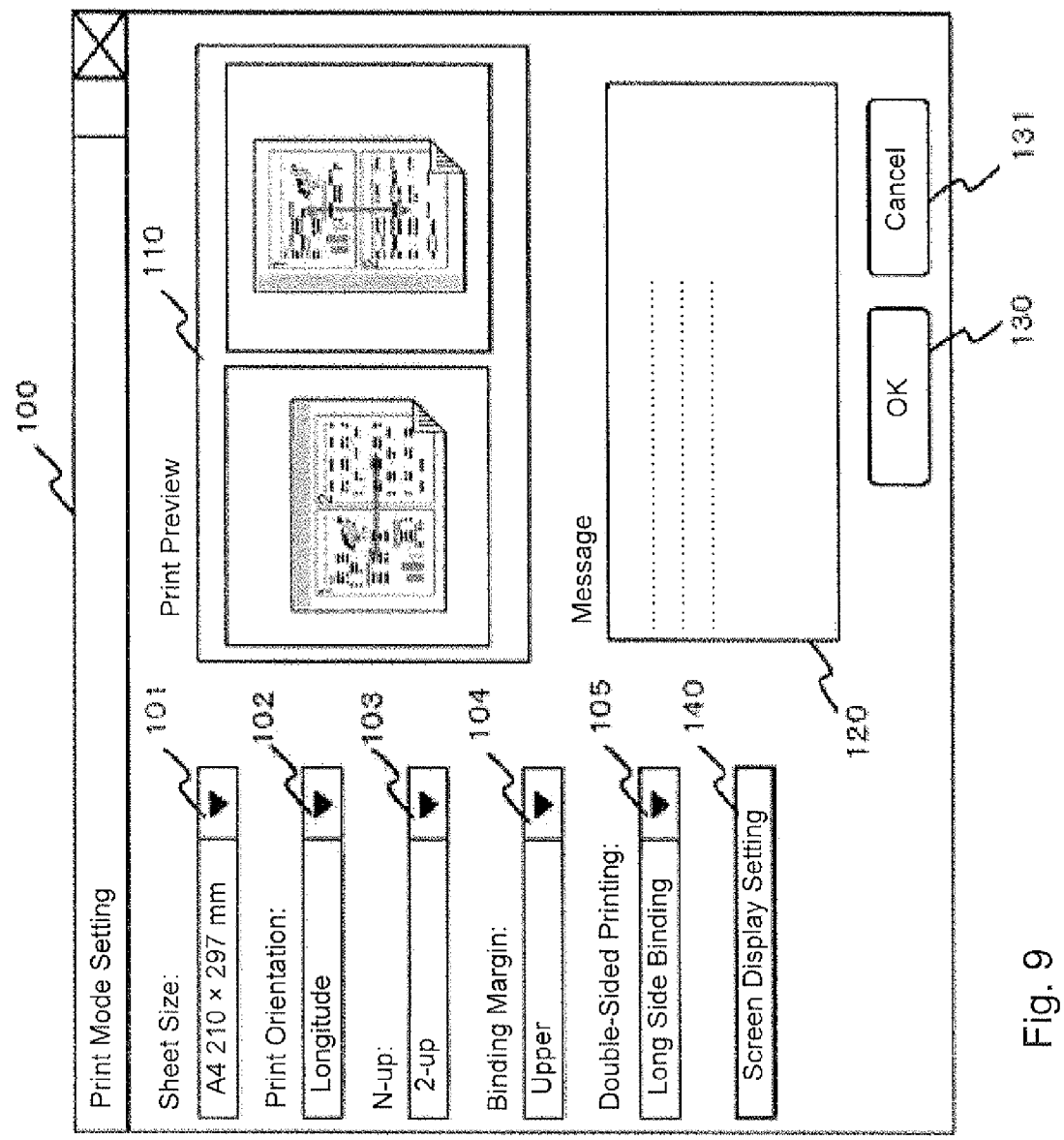
FIG. 9 is an explanatory schematic view of a print mode setting screen of the second embodiment.
Figure 10:
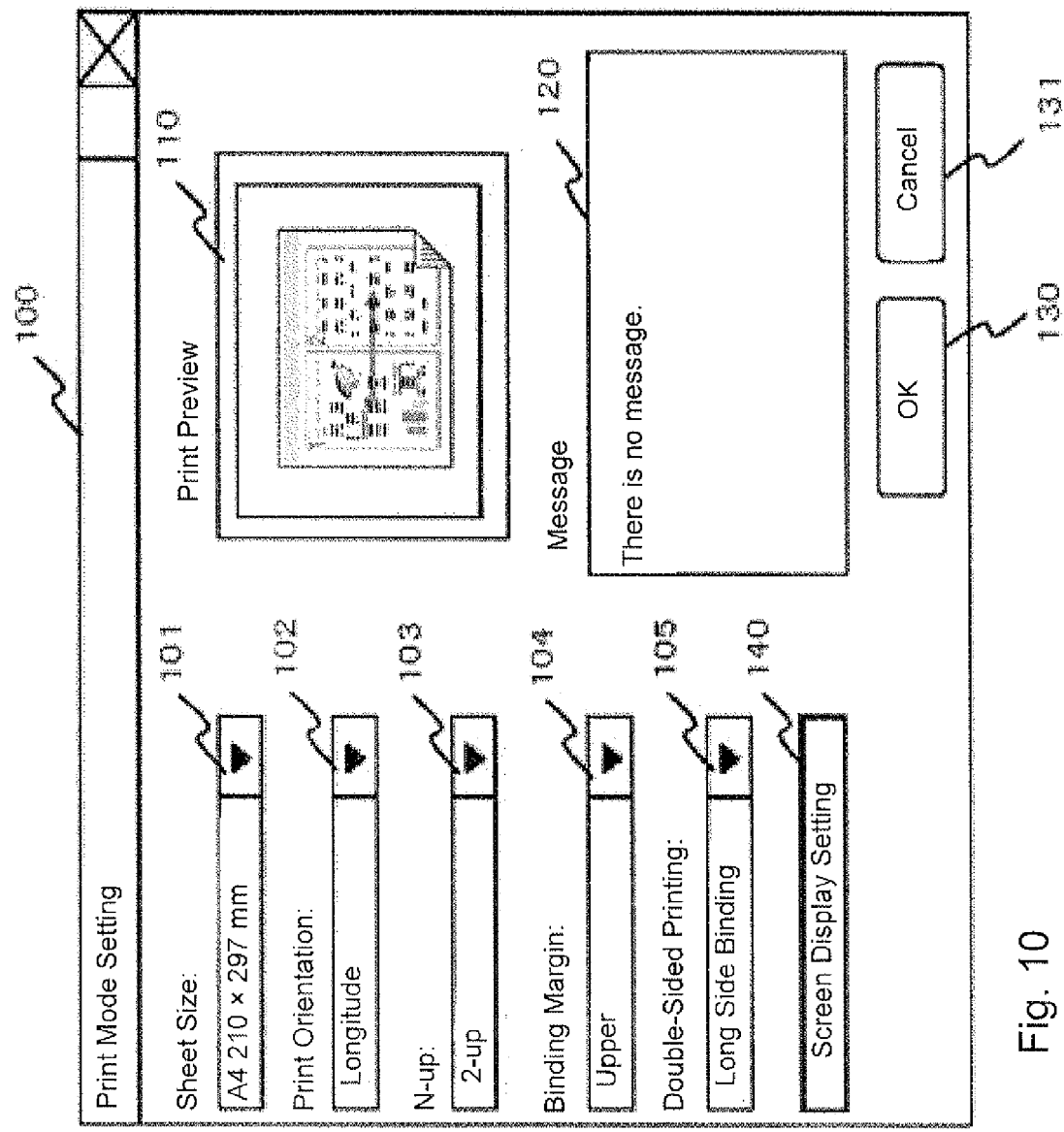
FIG. 10 is an explanatory schematic view of the print mode setting screen of the second embodiment.

At Step 24, the print mode setting change program 30 displays a setting screen (or a print mode setting) at the display device 4 based on the content of the print mode setting part 40. The setting screen that is displayed at this time is shown in FIG. 9 or FIG. 10. FIGS. 9 and 10 are explanatory schematic views of a print mode setting screen of the second embodiment. In FIGS. 9 and 10, each of these settings are displayed in the print mode setting screen 100: a sheet size 101; a print orientation 102; N-up 103; a binding margin 104; double-sided printing 105; a screen display setting button 140; an "OK" button 130, and a "Cancel" button 131.

Selectable values for each of the above settings are enumerated in a list shown in FIG. 6 in the same manner as the first embodiment. The sheet size 101 assigns a sheet size to print. The print orientation 102 can select either using the sheet in a lateral orientation (landscape) or using the sheet in a longitudinal orientation (portrait). The N-up 103 is a function to aggregate a plurality of pages into one sheet. The binding margin 104 is a function to insert a margin into any of four sides of the sheet. The double-sided printing 105 assigns whether page data is printed on only one side of the sheet or on both sides of the sheet. When the page data is printed on both sides of the sheet, the double-sided printing 105 assigns either printing the sheet in a state in which a rear side is rotated by 180 degrees so that when the short side of the sheet is bound, it is easy to read the printed sheet or in which the rear side is not rotated so that the long side of the sheet is bound, it is easy to read the printed sheet.

In the print mode setting screen 100 shown in FIGS. 9 and 10, the following settings are selected: the sheet size 101 is A4 (210 mm×297 mm); the print orientation 102 is longitude; the N-up 103 is 2-up; the binding margin 104 is upper; and the double-sided printing 105 is the long side binding.

At Step 25, the type of the specified application is determined. Specifically, it is determined which IOP application or CPO application is specified at Step 22.

When an IOP application is determined at Step 25, it moves to Step 26, and it is decided that the following display method of the print preview is adopted: both previews in a longitudinal print orientation (portrait) and a lateral print orientation (landscape) are displayed.

Figure 11:
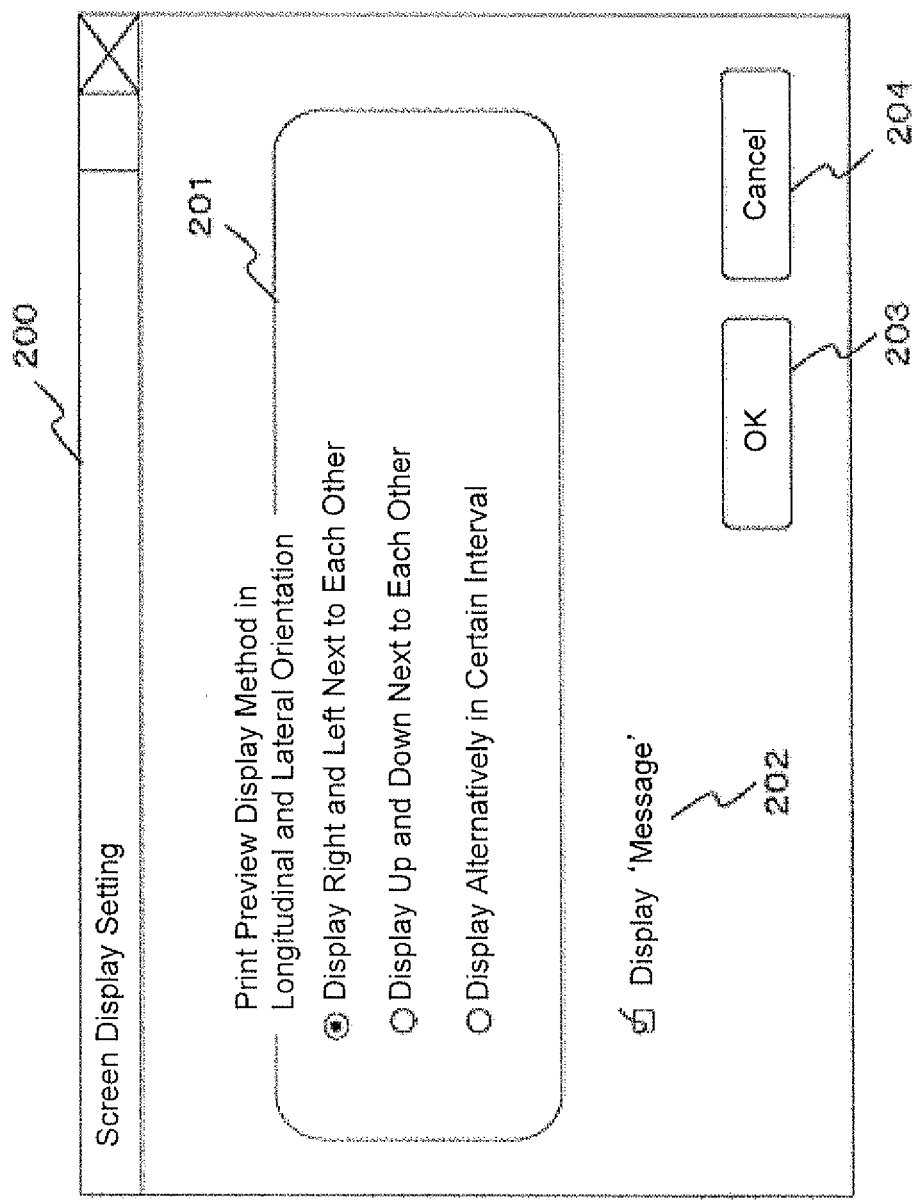
FIG. 11 is an explanatory schematic view of a screen display setting of the second embodiment.

In the second embodiment, three display methods can be selected on the print mode setting screen 200 shown in FIG. 11 as a print preview display method for displaying both previews in the longitudinal and lateral print orientations. In other words, there are the following three methods: "Display Right and Left Next to Each Other"; "Display Up and Down Next to Each Other"; and "Display Alternatively in Certain Interval." The display method shown in FIG. 9 is an example in which "Display Right and Left Next to Each Other" is selected as the method for displaying both previews in the longitudinal and lateral print orientations.

On the other hand, when a CPO application is determined at Step 25, it moves to S27, and the print preview display method deciding program 33 decides a display method of the print preview in which the print preview is displayed in the first print orientation designated by the application. In this case, the print preview display is shown in the print mode setting screen 100 in FIG. 10.

At Step 28, the print preview displaying program 34 displays the print preview in the print preview display method that is decided at Step 26 or Step 27. A print preview 110 shown in FIG. 9 or FIG. 10 is formed with the following conditions: a print orientation assigned by the print orientation 102 is obtained; a longitude to lateral ratio is obtained based on a sheet size assigned by the sheet size 101; then, a rectangle with the obtained ratio and the orientation is drawn; a folding back portion is drawn in accordance with the setting assigned by the double-sided printing 105; a rectangle is drawn at a position in which a margin assigned by the binding margin 104 is inserted; and a rectangle representing a page or pages is arranged by shrinking in accordance with a value assigned by the N-up 103.

When the page preview display method is decided at Step 27, the print preview 110 only shows the print preview in a print orientation assigned by the print mode setting part 40 as shown in FIG. 10. In addition, the phrase "There is no message" is displayed in a message field 120.

When the page preview display method is decided at Step 26, the print preview 110 shows both print previews, a longitudinal print orientation (portrait) and a lateral print orientation (landscape), as shown in FIG. 9. In addition, the phrase "In application A, settings for a sheet size and a print orientation that are assigned by the application have a priority over the settings assigned here. Because the print orientation assigned here may be different from an actual one, please confirm an entire image with both longitudinal and lateral print orientations" is displayed in the message field 120. This message is an example in the case in which the print mode setting change program 30 is invoked by, for example, the application A 11. In the second embodiment, "Display 'Message'" 202 in a screen display setting 200 shown in FIG. 11 can set whether the message field 120 is displayed or not. In both FIGS. 9 and 10, the message field 120 is activated by placing a check mark next to "Display 'Message'" 202.

In an example of the print preview 110 shown in FIG. 9, the following settings are selected: the sheet size 101 is A4 (210 mm×297 mm); the print orientation 102 is longitude; the N-up 103 is 2-up; the binding margin 104 is upper; and the double-sided printing 105 is the long side binding. The print preview 110 is drawn in the following manner. Since the sheet size is A4 (210 mm×297 mm), the longitude to lateral ratio is 210:297. In order to decide an orientation for drawing a rectangle, it is necessary to pay attention to the setting value of the N-up 103. When the setting value is 2-up, 6-up, or 8-up, each of the values for the longitudinal and lateral orientations assigned based on the print orientation are reversed. Here, since the N-up 103 is 2-up, and the print orientation 102 is longitude, a rectangle with the longitude to lateral ratio of 210:297 is drawn in the left hand side, and a rectangle with the longitude to lateral ratio of 297:210 is drawn in the right hand side next to the rectangle with the longitude to lateral ratio of 210:297.

Next, because the double-sided printing 105 is the long side binding, a folding back portion is drawn. At this time, it is necessary to pay attention to a position of the binding margin 104. Because the binding margin 104 is upper, the folding back portion is drawn in the lower right position of both longitudinal and lateral print previews. Then, because the binding margin 104 is upper, and the print orientation 102 is longitude, a rectangle representing a position for a margin is drawn in an upper part of the longitudinal print preview, and a rectangle representing a position for a margin is drawn in a left part of the lateral print preview. Usually, a relative position of the binding margin 104 for the longitudinal orientation of the print orientation 102 with respect to the lateral orientation of the print orientation 102 is at a position rotated by 90 degrees in a clockwise direction. Because the N-up 103 is 2-up in the above situation, a relationship between the longitudinal orientation and the lateral orientation are reversed so that the relative position is at a position rotated by 90 degrees in a counterclockwise direction. When the print orientation 102 is assigned as the longitude, and the binding margin 104 is assigned as upper, the lateral orientation is located at the left hand side in a position in which the position of the longitudinal orientation rotates by 90 degrees in a counterclockwise direction. Then, because the N-up 103 is 2-up, two rectangles are drawn next to each other. The rectangle is drawn with a size in a state in which the rectangle can fit within an originally drawn rectangle.

Next, it is determined whether or not the setting content is changed. Specifically, at Step 29, the print mode setting change program 30 determines whether or not a value of a target function of the print mode setting screen 100 is changed. When the value of the target function is changed (Yes), the print preview 110 is newly displayed with the changed value at Step 28. When the setting content is not changed, it moves to S30.

Next, by selecting "Print Preview Display Method in Longitudinal and Lateral Orientations" 201 and "Display 'Message'" 202 in the print preview 110, the display method selecting program 35 performs a screen display setting. Specifically, it is determined whether or not the screen display setting is changed at Step 30. When the screen display setting is changed, a user P pushes the screen display setting button 140 on the print mode setting screen 100 in order to activate the display method selecting program 35. Then, the screen display setting 200 shown in FIG. 11 is displayed. The user P changes the settings of "Print Preview Display Method in Longitudinal and Lateral Orientations" 201 and "Display 'Message'" 202 that are displayed on the screen display setting 200, and then the user P pushes down an OK button 203 or a Cancel button 204. When the Cancel button 204 is pushed down, the setting content that is changed by the screen display setting 200 is discarded, and the screen display setting 200 is terminated. When the setting content is changed, an operation is returned to Step 25 to perform the remaining processes in order to reflect the changed content to the print mode setting screen 100.

When the screen display setting 200 is not changed, the OK button 130 or the Cancel button 131 on the print mode setting screen 100 is pushed down. When the Cancel button 131 is pushed down at Step 31 (Yes), the setting content that is set by the print mode setting screen 100 is discarded, and the print mode setting screen 100 is closed so that the print mode setting change program 30 is terminated. When No at Step 31, it moves to Step 32. When the OK button 130 is pushed down at Step 32 (Yes), the setting content that is set by the print mode setting screen 100 is stored in the print mode setting part 40 at Step 33, and the print mode setting screen 100 is closed so that the print mode setting change program 30 is terminated. Until the OK bottom is pressed, the process is repeated.

As discussed about the second embodiment above, the following effects in addition to the effect of the first embodiment are obtained. When both print previews, a longitudinal print orientation (portrait) and a lateral print orientation (landscape), are displayed, the display method can be changed. Therefore, an easily viewable screen for a user can be selected.

In the above first and second embodiments, as an example, a print mode setting change program that is included in a printer driver which transmits data to a printer is explained. However, the present invention is not limited to this and can be applied to a print mode setting change program of a facsimile driver that prints a document formed by a computer as a facsimile machine. In the above embodiments, as examples for application that do not give a proper print orientation, Microsoft Word® and Microsoft Power Point® are mentioned. As another example, Adobe Reader® may be considered.

The print processing device, the image processing device, and the method for setting a print mode being thus described, it will be apparent that the same may be varied in many ways. Such variations are not to be regarded as a departure from the sprit and scope of the invention, and all such modifications as would be apparent to one of ordinary skill in the art are intended to be included within the scope of the following claims.

What is claimed is:

1. A print processing device, comprising:
a display device that is connected to the print processing device and that displays a print preview of a print document including a letter or an image;
a plurality of application programs;
an application specifying part that specifies the application program which is used to compose the print document;
a print mode setting part that stores print mode setting information;
an application determining part that determines whether or not the application program, which is specified by the application specifying part, is a program that is likely not to provide to the print mode setting part a print orientation information in correspondence with the print document as actually printed;
a print preview display method deciding part that determines a display method of the print preview based on a determination result by the application determining part; and
a print preview displaying part that displays the print preview according to the display method that is decided by the print preview display method deciding part.

2. The print processing device according to claim 1, wherein
when the application determining part determines that the application program, which is specified by the application specifying part, is a program that is likely not to provide the print orientation information in correspondence with the print document as actually printed, the print preview display method deciding part determines to display first and second print previews, the first print preview is in a first print orientation designated by the application program, the second print preview is in a second print orientation that differs from the first print orientation.

3. The print processing device according to claim 2, wherein
the print preview displaying part concurrently displays the first and second print previews next to each other.

4. The print processing device according to claim 3, wherein
orientations of the two print previews are decided based on the print orientation information designated by the specified application program.

5. The print processing device according to claim 2, further comprising:

a display method selecting part that is configured to let a user to select either the first print preview or the second print preview when the print preview display method deciding part determines to display the first and second print previews.

6. The print processing device according to claim 5, wherein
the display method selecting part alternatively displays the first and second print previews at a predetermined interval.

7. The print processing device according to claim 1, wherein
the application determining part determines, based on a type of the application program, whether or not the application program is a program that is likely not to provide the print orientation information in correspondence with the print document as actually printed.

8. The print processing device according to claim 1, further comprising:
an application information part that stores a list of the application programs that are likely not to provide the print orientation information in correspondence with the print document as actually printed.

9. The print processing device according to claim 1, wherein
when the application determining part determines that the specified application program is likely not to provide the print orientation information in correspondence with the print document as actually printed, the print preview display method deciding part displays a message indicating a possibility of improper print operation.

10. The print processing device according to claim 1, wherein
the print preview display method deciding part determines to display first and second print previews, the first print preview is in a first print orientation designated by the application program, the second print preview is in a second print orientation that differs from the first print orientation, when the application determining part determines that the application program, which is specified by the application specifying part, is a program that is likely not to provide the print orientation information in correspondence with the print document as actually printed, and
the print preview display method deciding part determines to display the first print preview without the second print preview, when the application determining part determines that the application program, which is specified by the application specifying part, is not a program that is likely not to provide the print orientation information in correspondence with the print document as actually printed.

11. The print processing device according to claim 1, further comprising:
an application information part that stores a list of the application programs that are likely not to provide the print orientation information in correspondence with the print document as actually printed, wherein
the application determining part determines that the application program is not a program that is likely not to provide the print orientation information in correspondence with the print document as actually printed, when the application program specified by the application program specifying part is not included in the list in the application information part.

12. The print processing device according to claim 1, further comprising:
a print preview display method selecting part that is configured to let a user to select a display positioning of the first print preview and the second print preview on the relative to each other on a display device, when the print preview display method deciding part determines to display the first and second print previews.

13. A print processing device, comprising:
a display device that is connected to the print processing device and that displays a print preview of a print document including a letter or an image;
a memory part that includes programs; and
a control part that executes the programs stored in the memory part, wherein
the memory part includes:
a plurality of application programs that compose print documents,
an application specifying program that specifies the application program that composed the print document;
an application determining program that determines whether or not the application program specified by the application specifying program is an application program that is likely not to provide to a print mode setting part print orientation information in correspondence with the print document as actually printed;
a print preview display method deciding program that determines a display method of the print preview based on a determination result by the application determining program; and
a print preview displaying program that displays the print preview in the display method that is determined by the print preview display method deciding program.

14. A method for setting a print mode executed by a print processing device that is connected a display device displaying a print preview of a print document including a letter or an image, and that includes a plurality of application programs, comprising:
specifying an application program that composes a print document;
determining whether or not the specified application program is an application program that is likely not to provide print orientation information in correspondence with the print document as actually printed;
deciding a display method based on the determination result; and
displaying the print preview of the print document at the display device based on the determined display method.

* * * * *